(12) United States Patent
Kaburlasos et al.

(10) Patent No.: US 9,123,088 B2
(45) Date of Patent: Sep. 1, 2015

(54) PARTIAL TILE RENDERING

(71) Applicant: Intel Corporation, Santa Clara, CA (US)

(72) Inventors: Nikos Kaburlasos, Lincoln, CA (US); Eric C. Samson, Folsom, CA (US); Robert B. Taylor, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 13/955,228

(22) Filed: Jul. 31, 2013

(65) Prior Publication Data

US 2015/0035853 A1 Feb. 5, 2015

(51) Int. Cl.
*G06F 15/00* (2006.01)
*G06T 1/00* (2006.01)

(52) U.S. Cl.
CPC ........................................ *G06T 1/00* (2013.01)

(58) Field of Classification Search
None
See application file for complete search history.

(56) References Cited

U.S. PATENT DOCUMENTS

2010/0118042 A1* 5/2010 Willis et al. .................... 345/545
2014/0108909 A1* 4/2014 Geelnard ....................... 715/234
2014/0354664 A1* 12/2014 Brown ........................... 345/545

* cited by examiner

*Primary Examiner* — Phi Hoang
*Assistant Examiner* — Mohammad H Akhavannik
(74) *Attorney, Agent, or Firm* — Trop, Pruner & Hu, P.C.

(57) ABSTRACT

In accordance with some embodiments, partial rendering of non-changing or slowly changing frame tiles allows the graphics processing unit to spend less time processing non-changing or slowly changing portions of each frame, saving power and creating more room for performance in some embodiments.

30 Claims, 5 Drawing Sheets

PARTIAL TILE RENDERING

BACKGROUND

This relates generally to graphics processing.

The main function of a graphics processing unit is to render frames as requested by a graphics application. Graphics applications typically render all pixels in a frame buffer regardless of whether the pixels have changed from frame to frame or not. There are some graphics applications, such as casual game applications, that do not tend to update large portions of the frame buffer, from frame to frame.

BRIEF DESCRIPTION OF THE DRAWINGS

Some embodiments are described with respect to the following figures.

DETAILED DESCRIPTION

Figure 1:
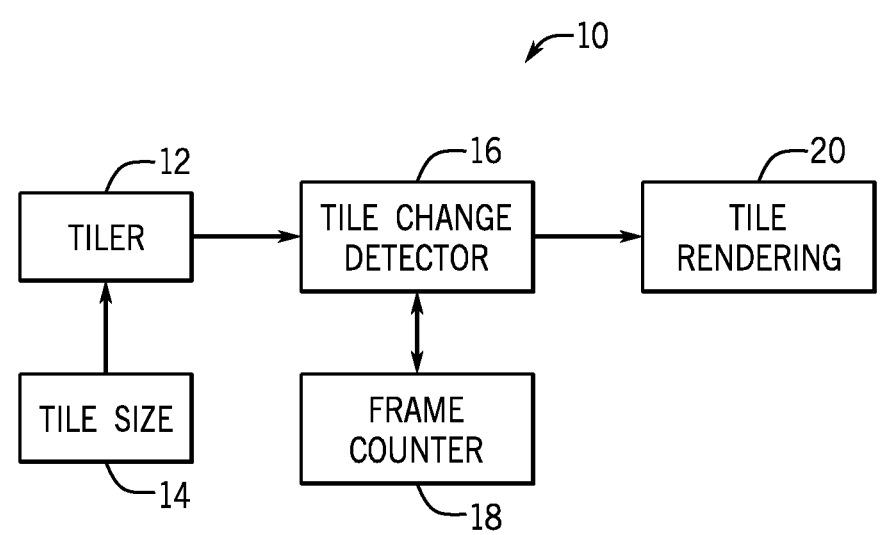
FIG. 1 is a schematic depiction for one embodiment.

In accordance with some embodiments, partial rendering of non-changing or slowly changing frame tiles allows the graphics processing unit to spend less time processing non-changing or slowly changing portions of each frame, saving power and creating more room for performance.

Thus in some embodiments, frames are broken up into tiles that are rendered separately. The number of tiles in a frame is generally fixed in one embodiment and does not change from frame to frame. However in other embodiments, variable tile sizes and tile counts within a frame may be used. By default, each tile is rendered fully. For example all pixels or 4×4 spans in a tile are rendered normally and updated in the frame buffer. A fully rendered tile is then compared against the same tile in a previous frame to determine whether any pixels may have changed. If no pixels have changed, then the tile is marked as non-changing and the partial rendering mode begins. A tile comparison may be done using a pixel by pixel comparison across all the pixels of two tiles or a sum of absolute differences operation on pixels of two tiles may be used. Other methods of comparing pixels may also be used. The tile comparison may be done in software, such as by a driver, by a compute shader executed on the graphics processing unit or by hardware fixed function units, in some embodiments. The comparison of two tiles may determine if the tiles are exactly the same or whether differences between the two tiles are limited to a magnitude under a predetermined threshold in which case there is a slow change from one tile to another. A tile may enter partial rendering when it is determined to be non-changing or, in the more general case, slowly changing.

When in the partial rendering mode, a tile is fully rendered and updated in the frame buffer at a slower rate. This rate may be a submultiple, such as one-third, one-fourth, or one-fifth, of a baseline frame rate that applies to the whole frame. Thus, in the following discussion, a tile "refresh" means that the tile is fully rendered and in fact all its pixels are rendered.

When a non-changing or slowly changing tile is in the partial render mode, it may be refreshed only once over a number of frames such as 3, 4 or 5 frames. This number of frames defines the tile's partial render cycle. If the tile is refreshed only once every four frames for example, its partial render cycle is four frames long. The refresh rate of different non-changing tiles need not be the same, in the general case. Also, the start of the partial render cycle of a tile need not coincide with that of another tile.

A non-changing tile is refreshed on the first frame of its partial render cycle in one embodiment. The rest of the time the tile is "partially rendered," meaning only a portion of the pixels or spans in the tile is computed normally for the purpose of enabling a comparison of those pixels with the same pixels of the tile in a previous frame. The previous frame may be the last time that the tile was fully rendered. If this comparison shows that the tile has likely not changed since the previous frame, the rest of its pixels are not rendered and instead they are copied from the previous frame.

Partial rendering may be done using an appropriate stencil buffer or depth buffer that skips pixel shading of pixels that are not to be rendered by a stencil mask or early depth cull.

Vertex shading is still done for the entire geometry in the whole frame but pixel shading may be localized and may occur for the targeted tile pixels at a reduced rate due to the early depth culling or stencil rejection. Vertex shading typically accounts for a smaller portion of the total graphics processing compute effort so saving pixel shading graphics processor cycles may have a larger impact on graphics power consumption. Reducing pixel shading work generally reduces graphic processing unit power dissipation more than input/output power dissipation consumed to copy non-changing frame tiles from the previous frame into the current frame.

The pixels that are rendered may be spread throughout the tile area either randomly or based on a pattern, such as every fourth or fifth pixel or span of the tile. Spreading out the rendered pixels may increase the probability that if some change occurs within the time from frame to frame, that change will be detected in the subset of pixels that were rendered, since a change in one pixel usually affects a number of neighboring pixels.

A partially rendered tile may have the same subset of pixels rendered in a pair of back to back frames so that those pixels can be compared. However, a different subset of pixels may be rendered in a subsequent pair of frames so that the comparison may cover more tile pixels over time. When a tile is in the partial render mode there is a tension between rendering more tile pixels, to increase the probability that a change is detected, and rendering fewer pixels, so that power savings can be increased.

Referring to FIG. 1, in accordance with one embodiment, a graphics processing unit 10 includes a tiler 12 that divides a frame into tiles of a desired size. The smaller the tile size that is selected, the more likely it is that tiles that are unchanging will be identified. The tiler 12 receives a tile size input from the tile size unit 14. In one embodiment the tile size may come from a graphics application.

The tiler provides the tiles to a tile change detector 16 which may use any of the techniques described previously or other techniques that determine whether successive tiles have pixels whose values are changing. A frame counter 18 may provide the tile change detector with an indication of how many frames have passed since a particular tile changed or since the last time a non-changing tile was refreshed. The frame counter may also keep track of the individual partial render cycle of each non-changing tile.

Finally rendering occurs on a tile by tile basis at renderer 20 in one embodiment.

Figure 2:
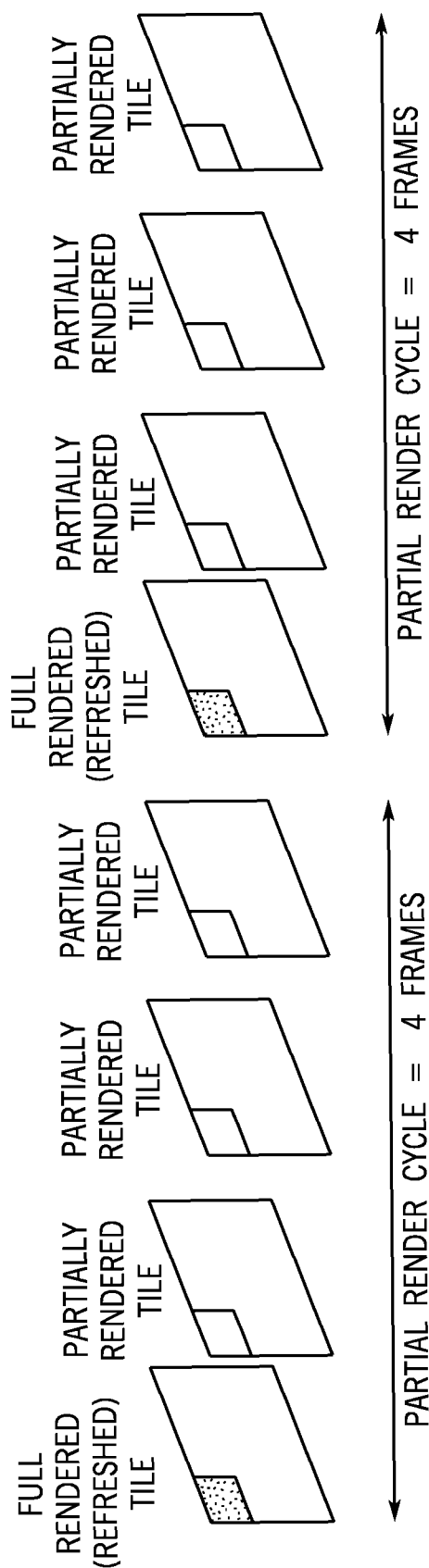
FIG. 2 is a depiction of a partial render cycle according to one embodiment.

Referring to FIG. 2, an example involving a series of frames with a non-changing tile in the upper left corner of each frame is shown. The non-changing tile is refreshed every four frames in this example, so the partial render cycle is four frames long. A tile is rendered partially and copied over from the previous frame in the second, third, fourth frames of each partial render cycle. The tile refresh rate and the partial render cycle length need not remain fixed, but rather may vary over time. If a pixel change is detected within a partially rendered tile, the tile exits the partial render mode immediately and is fully rendered starting with the following frame in one embodiment.

There is a possibility that a change that occurs in a partially rendered tile may go undetected initially, if it has occurred in pixels or subspans that were not rendered and were not immediately compared. This may cause the tile to continue to be refreshed at a lower rate for a longer time until the change does get detected. Hence the comparisons of partially rendered tiles to previous versions of the same tile may be done in an efficient manner so that changes that may have occurred are detected as soon as possible and so that the tile can exit partial render mode and start getting rendered at the full frame rate again.

Many techniques may be used for detecting changes in non-changing tiles with varying degrees of complexity and efficiency. For example, the subset of rendered tile pixels may be the same in a pair of frames so as to insure that the pixel comparisons can be done in a meaningful way. One simple tile comparison technique compares the exact same subset of tile pixels between neighboring frames for the entire duration of the partial render cycle. One variation of this scheme is that, in the subsequent pair of frames, a different subset of tile pixels are rendered and compared than in the previous pair of frames, so that over time more tile pixels are rendered and compared. For example, referring to FIG. 2, the upper left tile may be compared between the first and second frames using a certain subset of its pixels, and then compared between the third and fourth frames using a different subset of its pixels. According to still another technique, which may be used in addition to or as an alternative to the techniques described above, each non-changing tile may be compared fully at the start of each new partial render cycle with the same tile at the start of the previous partial render cycle. A nonchanging tile may be rendered fully at the start of each partial render cycle. This full rendering enables a full pixel by pixel comparison of the tile with the previous version of the same tile a few frames back and guarantees that any change that occurred in the tile since the start of the last render cycle is detected. So if the partial render cycle is four frames long, then any change that occurred in the tile during the last four frames is detected at the start of the next partial render cycle at the very latest. The change could be detected earlier as well, depending on which subset of tile pixels was rendered and compared during the partial render cycle. Essentially, a partial render cycle of four frames insures that a non-changing tile is refreshed at a rate that is at least one-fourth of the baseline frame rate. Rendering partially this and other non-changing tiles likely saves enough power to raise the graphics processing unit frequency and baseline frame rate, so the refresh rate of the non-changing tile may be guaranteed to be at least one-fourth of an increased baseline frame rate in some embodiments.

These detection schemes may involve storing in memory a few of the previously rendered frames, since each non-changing tile in a frame may have its own individual partial render cycle length, typically two to five frames long. So at any time any non-changing tile may involve a comparison to pixels in a frame up to five frames back.

Different policies may be used to determine the rate of tile refresh. One policy is that the faster the baseline frame rate, the lower the relative refresh rate of an unchanging tile. At the same time, it may be assured that a minimum tile refresh rate is preserved, such as 10 frames per second. Thus, as an example if the frame base rate is 60 frames per second, a non-changing tile may be refreshed at 60 frames per second divided by 5 or 12 frames per second. If the baseline frame rate drops to 49 frames per second, then a non-changing tile may be refreshed at 49 frames per second divided by 4 equals 12.3 frames per second and so on.

Figure 3:
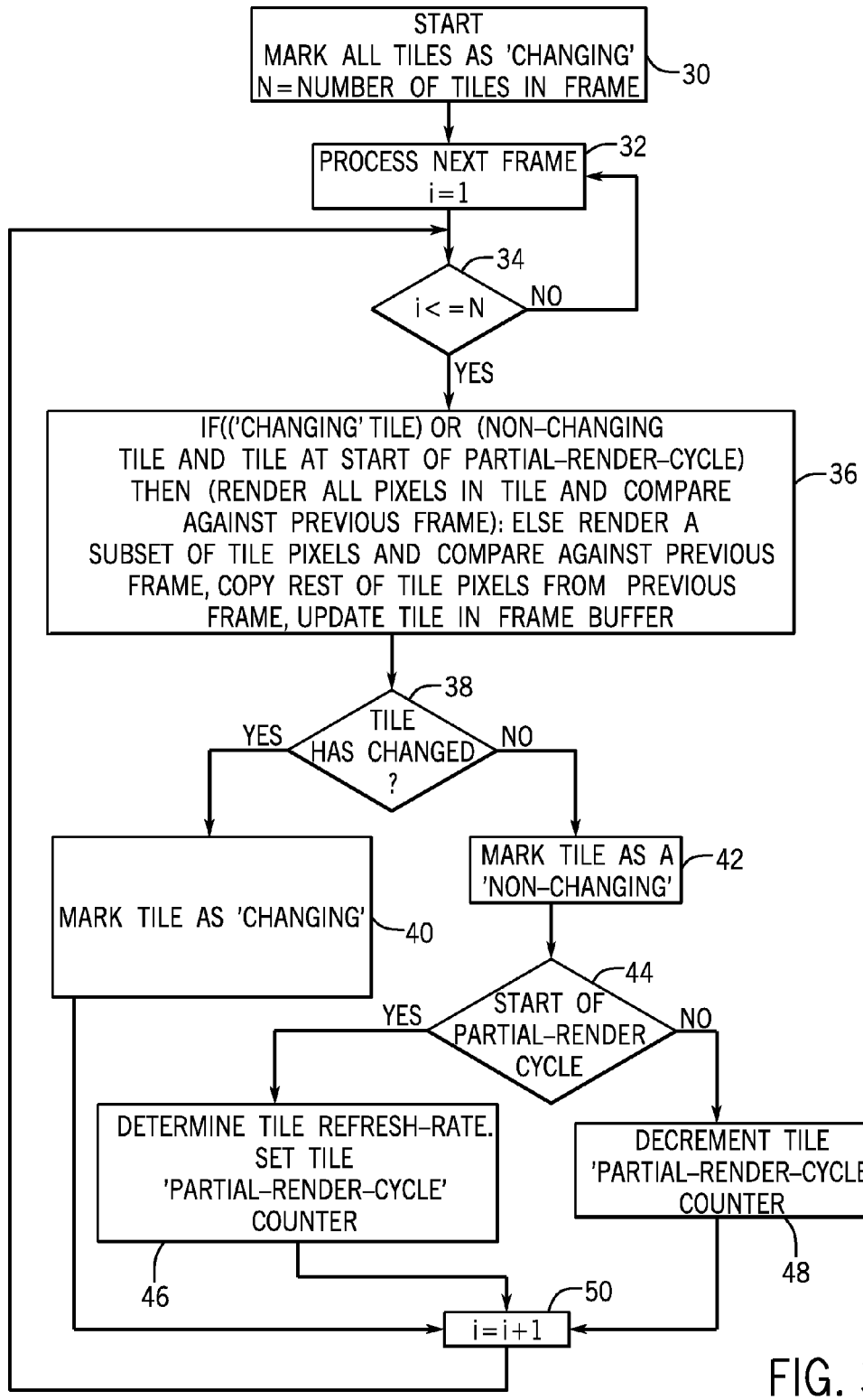
FIG. 3 is a flow chart for one embodiment.

Referring to FIG. 3, a sequence for partial tile rendering according to one embodiment may be implemented in software, firmware and/or hardware. In software and firmware embodiments it may be implemented by computer executed instructions stored in one or more non-transitory computer readable media such as a magnetic, optical or semiconductor storage.

The sequence shown in FIG. 3 includes a loop that repeats sequentially for every tile in the frame. In another embodiment, each tile can be processed in parallel. A changing tile is fully rendered. It is also fully compared against the same tile in the previous frame to detect a change in this embodiment. A non-changing tile is rendered fully only at the start of its partial render cycle according to one embodiment. The rest of the time the non-changing tile is rendered partially and it is compared against the previous frame. If the tile continues to be non-changing, it is copied into the frame buffer from the previous frame because the tile does not need to be fully rendered. However if a change is detected in the tile that is currently considered to be non-changing, then the tile is marked as changing so that it can be fully rendered on the following frame.

The first time a tile is flagged as non-changing, it is at the start of a partial render cycle. At that point, a counter (for example see counter 18 in FIG. 1) is updated for the tile to determine the length of its partial render cycle. For example if the partial render cycle is four frames long, the counter is set to 4−1=3. In every one of the following frames where the tile remains unchanged, the tile continues to be flagged as non-changing and its partial render cycle counter decrements. When the counter gets to zero, the tile is fully rendered, regardless of whether it continues to be unchanging or not.

Thus, referring to FIG. 3, all tiles are marked as "changing" and N equals the number of tiles in a frame, as indicated in block 30. The next frame is then selected and i is set equal to 1 in block 32. A check at diamond 34 determines whether i is less than or equal to the number of frames N. If not, the flow goes back to get another frame at block 32. If so, the flow goes to block 36. If the tile is changing, or if there is a non-changing tile and it is at the start of a partial render cycle, then all the pixels in the tile are rendered and compared against the previous frame. Otherwise a subset of the tile pixels are rendered and compared against a previous frame. The rest of the pixels are copied from the previous frame and the file is updated in the frame buffer. At this point there are no updates in the frame buffer.

At block 38 a check determines whether the tile has changed. If not, the tile is marked as non-changing in block 42. A check at diamond 44 determines if this is a start of a partial render cycle. If not, the tile partial render cycle counter is decremented in block 48.

If this is a start of a render cycle, as determined in diamond 44, then the tile refresh rate is determined as indicated in block 46 and the partial render cycle counter is set. The variable i is incremented by 1 as indicated in block 50 and the flow iterates.

If the tile has changed as determined in diamond 38, then the tile is marked as changing in block 40.

The quality of the frame stream rendered is dependent on the length of the partial render cycle for each non-changing tile. If the partial rendering cycle length is reasonably small, for example 3 or 4 frames, then in the event that the tile contained a change that went undetected, the tile is still fully rendered no more than three or four frames later, so that a minimum refresh rate for the tile is guaranteed. This may help in reducing visual artifacts.

Most of the partial render algorithm described herein may be implemented via compute shaders running on a graphics processing unit. However, partial tile render performance may be improved with special purpose fixed function hardware designed to quickly and efficiently compare frame tiles in the RGB format.

In some embodiments power dissipation may be reduced and performance may be increased, when rendering graphics frames that include portions that remain unchanged over a period of time. Thus by combining concepts of tiling and lack of change detection, in order to reduce the refresh rate of individual tiles in the frame, power savings may be achieved by employing partial rendering of non-changing tiles.

The same techniques may also be extended to reduce a refresh rate of slowly changing tiles such as tiles that contain a small amount of change as measured by a predefined measure. For example, one measure of change may be a sum of absolute difference threshold value from frame to frame. Then more slowly changing tiles (below the threshold) may take advantage of the fact that they include a smaller degree of change and may be fully rendered at a slower rate relative to the baseline frame rate, since it is typically the fast changing geometries that benefit most from the higher render rate.

Figure 4:
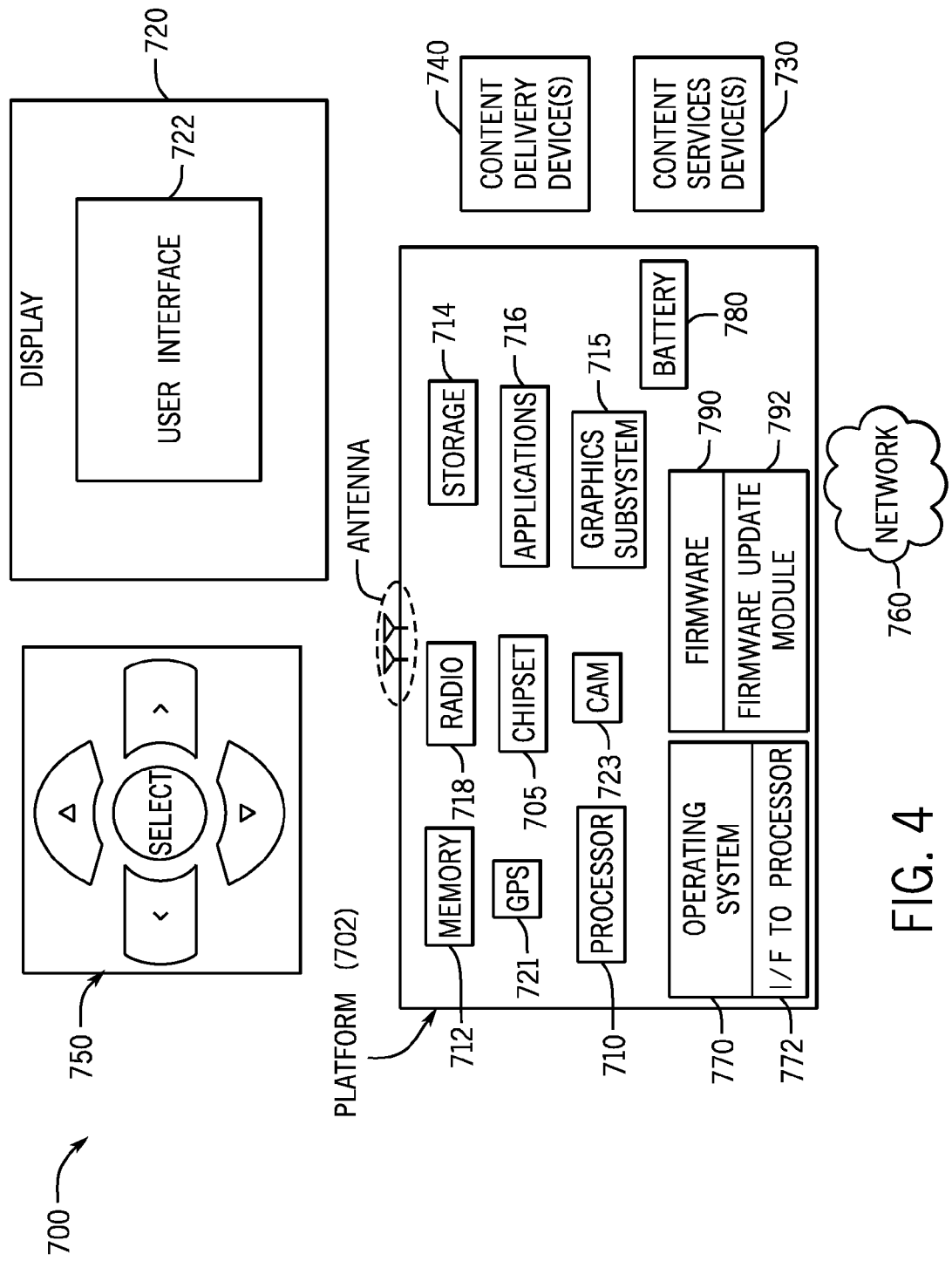
FIG. 4 is a schematic depiction of a system according to one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequence of FIG. 3 together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 5:
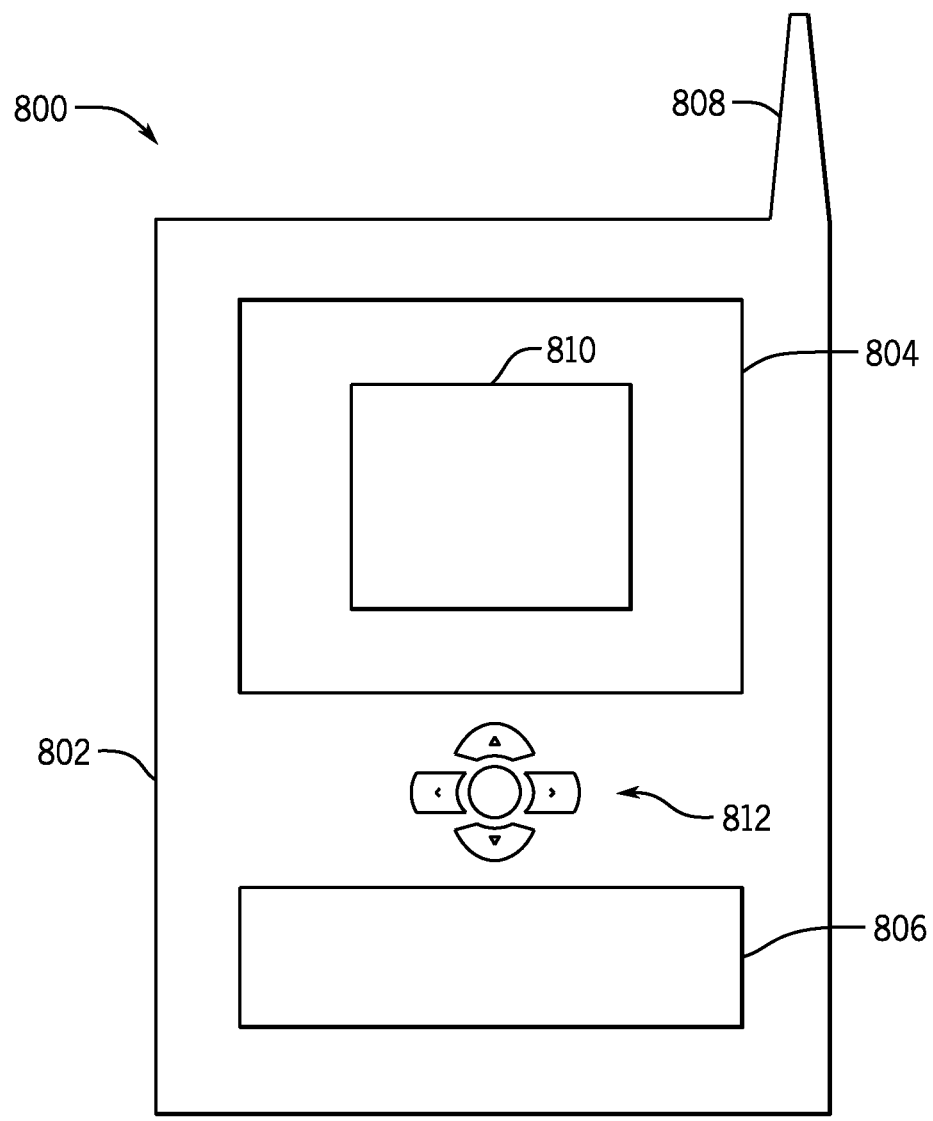
FIG. 5 is a front elevational view of one embodiment.

As described above, system 700 may be embodied in varying physical styles or form factors. FIG. 5 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIG. 3 in software and/or firmware embodiments.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising splitting a frame into tiles, determining whether pixels in a tile change from one frame to another frame by an amount, fully rendering the tile if the pixel change is detected; and partially rendering the tile if the pixel change is not detected. The method may also include detecting a pixel change of any extent. The method may also include detecting tiles with pixels that change by an amount above a threshold. The method may also include wherein partially rendering includes fully rendering the tile after a given number of frames. The method may also include determining again whether pixels in the tile that did not change by an amount, change after a given number of frames. The method may also include comparing the tile after the given number of frames to the same tile in the immediately preceding frame. The method may also include comparing the tile after the given number of frames to the pixels in the tile at the beginning of the given number of frames. The method may also include determining including comparing the same pixels in a pair of successive tiles. The method may also include comparing a first set of pixels in two successive tiles and a different set of pixels in two subsequent tiles.

Another example embodiment may be one or more non-transitory computer readable media storing instructions to enable a processor to perform a sequence comprising splitting a frame into tiles, determining whether pixels in a tile change from one frame to another frame by an amount, fully rendering the tile if the pixel change is detected, and partially rendering the tile if the pixel change is not detected. The media may further store said sequence including detecting a pixel change of any extent. The media may further store said sequence including detecting tiles with pixels that change by an amount above a threshold. The media may further store said sequence wherein partially rendering includes fully rendering the tile after a given number of frames. The media may further store said sequence including determining again whether pixels in the tile that did not change by an amount, change after a given number of frames. The media may further store said sequence including comparing the tile after the given number of frames to the same tile in the immediately preceding frame. The media may further store said sequence including comparing the tile after the given number of frames to the pixels in the tile at the beginning of the given number of frames. The media may further store wherein determining including comparing the same pixels in a pair of successive tiles. The media may further store said sequence including comparing a first set of pixels in two successive tiles and a different set of pixels in two subsequent tiles.

In another example embodiment may be a graphics processing unit comprising a processor to split a frame into tiles, determine whether pixels in a tile change from one frame to another frame by an amount, fully render the tile if the pixel change is detected, and partially render the tile if the pixel change is not detected, and a storage coupled to said processor. The unit may include said processor to detect a pixel change of any extent. The unit may include said processor to detect tiles with pixels that change by an amount above a threshold. The unit may include said processor to partially render by fully rendering the tile after a given number of frames. The unit may include said processor to determine again whether pixels in the tile that did not change by an amount, change after a given number of frames. The unit may include said processor to compare the tile after the given number of frames to the same tile in the immediately preceding frame. The unit may include said processor to compare the tile after the given number of frames to the pixels in the tile at the beginning of the given number of frames. The unit may include said processor to determine by comparing the same pixels in a pair of successive tiles. The unit may include said processor to compare a first set of pixels in two successive tiles and a different set of pixels in two subsequent tiles. The unit may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   splitting a frame into tiles;
   determining a magnitude of pixel change from one frame to another;
   fully rendering the tile when the magnitude of pixel change is above a threshold;
   partially rendering the tile when the magnitude of pixel change is below a threshold; and
   wherein partial rendering includes:
      fully rendering the tile only after a number of frames are cycled and not rendering the tile until the number of frames are cycled.

2. The method of claim 1 including detecting a pixel change of any extent.

3. The method of claim 1 including detecting tiles with pixels that change by an amount above a threshold.

4. The method of claim 1 wherein partially rendering includes fully rendering the tile after a given number of frames.

5. The method of claim 4 including determining again whether pixels in the tile that did not change by an amount, change after a given number of frames.

6. The method of claim 4 including comparing the tile after the given number of frames to the same tile in the immediately preceding frame.

7. The method of claim 4 including comparing the tile after the given number of frames to the pixels in the tile at the beginning of the given number of frames.

8. The method of claim 1 wherein determining including comparing the same pixels in a pair of successive tiles.

9. The method of claim 1 including comparing a first set of pixels in two successive tiles and a different set of pixels in two subsequent tiles.

10. One or more non-transitory computer readable media storing instructions to enable a processor to perform a sequence comprising:
    splitting a frame into tiles;
    determining a magnitude of pixel change in a tile change from one frame to another;
    fully rendering the tile if the when the magnitude of pixel change is above a threshold;
    partially rendering the tile when the magnitude of pixel change is below a threshold; and
    wherein partial rendering includes:
       fully rendering the tile only after a number of frames are cycled and not rendering the tile until the number of frames are cycled.

11. The media of claim 10 said sequence including detecting a pixel change of any extent.

12. The media of claim 10 said sequence including detecting tiles with pixels that change by an amount above a threshold.

13. The media of claim 10 said sequence wherein partially rendering includes fully rendering the tile after a given number of frames.

14. The media of claim 13 said sequence including determining again whether pixels in the tile that did not change by an amount, change after a given number of frames.

15. The media of claim 13 said sequence including comparing the tile after the given number of frames to the same tile in the immediately preceding frame.

16. The media of claim 13 said sequence including comparing the tile after the given number of frames to the pixels in the tile at the beginning of the given number of frames.

17. The media of claim 10 wherein determining including comparing the same pixels in a pair of successive tiles.

18. The media of claim 10 said sequence including comparing a first set of pixels in two successive tiles and a different set of pixels in two subsequent tiles.

19. A graphics processing unit comprising:
    a processor to split a frame into tiles, determine a magnitude of pixel change in a tile from one frame to another, fully render the tile when the magnitude of pixel change is above a threshold, partially render the tile when the magnitude of pixel change is below a threshold;
    wherein partial rendering includes:
       fully rendering the tile only after a number of frames are cycled and not render the tile until the number of frames are cycled; and
    a storage coupled to said processor.

20. The unit of claim 19 said processor to detect a pixel change of any extent.

21. The unit of claim 19 said processor to detect tiles with pixels that change by an amount above a threshold.

22. The unit of claim 19 said processor to partially render by fully rendering the tile after a given number of frames.

23. The unit of claim 22 said processor to determine again whether pixels in the tile that did not change by an amount, change after a given number of frames.

24. The unit of claim 22 said processor to compare the tile after the given number of frames to the same tile in the immediately preceding frame.

25. The unit of claim 19 said processor to compare the tile after the given number of frames to the pixels in the tile at the beginning of the given number of frames.

26. The unit of claim 19, said processor to determine by comparing the same pixels in a pair of successive tiles.

27. The unit of claim 19 said processor to compare a first set of pixels in two successive tiles and a different set of pixels in two subsequent tiles.

28. The unit of claim 19 including an operating system.

29. The unit of claim 19 including a battery.

30. The unit of claim 19 including firmware and a module to update said firmware.

* * * * *